June 7, 1949.  C. J. ANDERSON  2,472,509
BLADE-SHEARING BAND SAW ATTACHMENT

Filed Aug. 29, 1946  2 Sheets-Sheet 1

INVENTOR.
Christopher J. Anderson
BY Clarence E. Threedy
His Attorney.

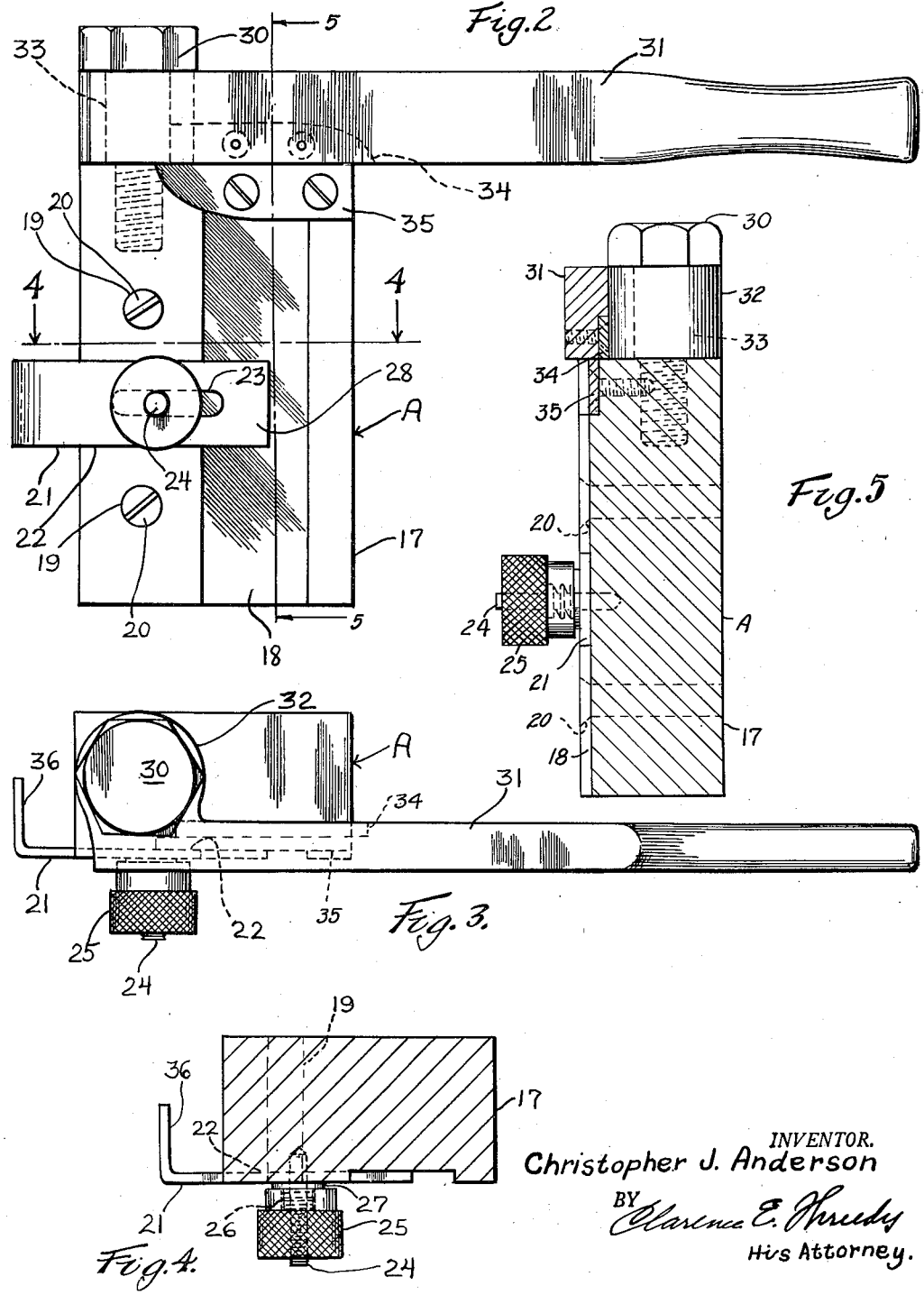

Patented June 7, 1949

2,472,509

UNITED STATES PATENT OFFICE 2,472,509

BLADE-SHEARING BAND-SAW ATTACHMENT

Christopher J. Anderson, Peru, Ind.

Application August 29, 1946, Serial No. 693,665

1 Claim. (Cl. 143—157)

This invention relates to blade-shearing band saw attachments.

More particularly the invention relates to a band saw blade shearing device. In this aspect of the invention an object is to provide a device of this character which will be highly efficient in use and economical in manufacture.

It is the general and common practice that in the repair of a band saw blade or in the replacement thereof, the band saw blade is severed by means of wire cutters, such as tin snips or the like. In performing this operation, either due to lack of ability on the part of the operator or due to carelessness, the ends of the severed blade will not be cut square, and in many cases burrs will be produced on the ends of the band saw blade where such ends are to be welded together, with the consequence that a perfect weld in impossible.

It is an object of this invention to provide a shearing device which may be attached to a frame of the band saw as a permanent structure thereof and in such manner as to provide a guiding groove extending in a direction corresponding to the long side of the band saw and with the shearing means operating transversely thereto, so that the band saw blade when removed from the pulleys over which it operates, may, with ease and readiness, be positioned in the guiding grooves and severed by a simple operation of the shearing means, without distorting, twisting, or otherwise misshaping the band saw blade.

While the principal and primary object is to provide such a device as an attachment to a band saw frame, it is also the object to provide such a device which is simple in construction, easy of operation, and which, when not attached to the frame of a band saw, may be attached to or supported upon a stationary support, such, for example a bench or the like.

A further and equally important object of the invention is the provision of a shearing device which will sever a band saw blade in a manner such that the ends will be substantially true, free of burrs, and capable of being readily welded together.

A still further and equally important object of the invention is to provide a device which has a shearing action upon the band saw blade during the severing operation and one which will sever the band saw blade without removing the band saw blade entirely from the frame or requiring distorting, bending, or twisting of the blade during the severing operation.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 2 is a side elevational view of the attachment as viewed in Fig. 1;

Fig. 3 is a top plan view of the attachment as viewed in Fig. 1;

Fig. 4 is a sectional detail view of the same taken substantially on line 4—4 of Fig. 2; and Fig. 5 is a sectional detail view taken substantially on line 5—5 of Fig. 2.

Figure 1:
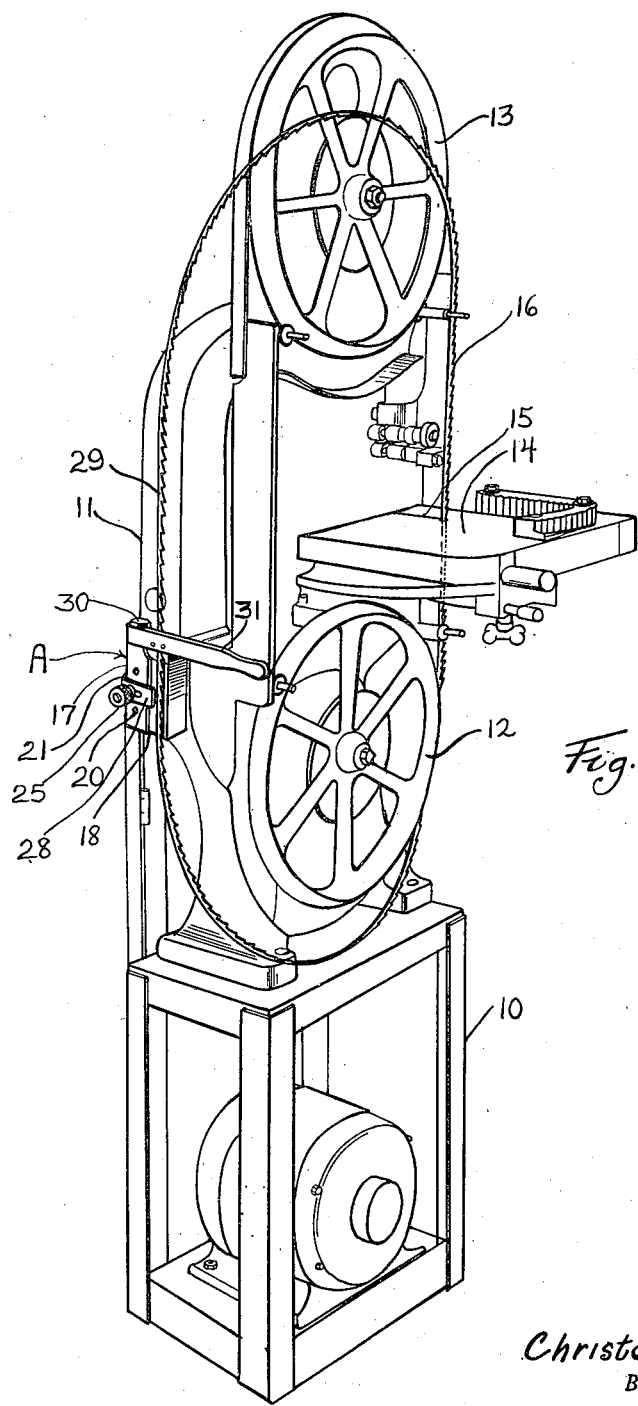
Fig. 1 is a perspective view of a standard band saw illustrating my attachment associated therewith.

The several objects of my invention are accomplished by the preferred form of construction illustrated in the accompanying drawings. In this connection a standard and well-known band saw comprises a base 10 upon which a frame structure 11 is mounted and which frame structure rotatably supports pulleys 12 and 13 adjustable relative to each other to vary the distance therebetween. In addition, this band saw includes a work table 14 having a band saw blade slot 15 through which the band saw blade 16 operates, the said band saw blade 16 being illustrated in Fig. 1 dismounted from the pulleys 12 and 13 over which said band saw blade normally operates.

My attachment is indicated at A and comprises a base plate 17. This base plate 17 is provided with a groove 18. The plate 17 is provided with openings 19 through which the mounting screws 20 are projected for attaching the base plate 17 to the adjacent element of the frame structure 11. In mounting this plate 17 to the frame element of the frame structure 11, it is preferably desirable that the guiding groove 18 extend longitudinally in a plane corresponding to the long sides of the band saw blade 16, so that when a portion of the band saw blade 16, after dismounting from the pulleys 12 and 13, is positioned in the guiding groove 18, it will not be necessary to bend or otherwise distort the blade 16. This groove 18 is of a width sufficient to accommodate band saw blades of various widths, and to substantially clamp the blade 16 in the groove 18 I provide a clamping finger 21. This clamping finger 21 is slidably arranged in a groove 22 formed in the plate 17 substantially at right angles with respect to the guiding groove 18. The finger 21 is provided with an elongated slot 23 through which projects a stud screw 24 carried by the plate 17. Threaded upon this stud screw 24 is a knurled nut 25 which bears against a spring 26 mounted in a socket formed therein. The spring 26 bears against a washer 27 mounted upon the stud screw 24 and in turn bearing against the finger 21. By adjusting the finger 21 relative to the groove 22, the end portion 28 thereof will be brought into bearing engagement with the adjacent edge 29 of the band saw blade 16 and be held in such engagement by the adjustment of the knurled nut 25, thereby firmly holding the band saw blade 16 in cutting position within the groove 18.

Pivoted to the plate 17 and offset with respect to the longitudinal axis thereof as viewed in Fig. 1, by means of a pivot bolt 30, is a handle 31. This handle 31 includes an enlarged boss 32 through which the shank 33 of the pivot bolt 30 projects.

Carried by this handle 31 adjacent the boss 32 is a shearing blade 34 which cooperates with a complementary shearing blade 35 carried by the plate 17, with both plates extending transversely of the groove 18.

By locating the shearing blade 34 adjacent the pivot bolt 30, it will be apparent that when the shearing blade 34 is brought around upon a band saw blade to shear the same with the cooperation of the shearing blade 35, a substantially shearing action will take place, thereby producing a straight and clean cut of the band saw blade 16.

To complete the invention the clamping finger 21 is provided with an angled end portion 36 to facilitate grasping the same between the fingers for adjustment purposes.

Viewing the invention as shown in Fig. 1, it will be seen that when the mounting plate 17 is attached to the adjacent frame element of the frame structure 11, the groove 18 extends in a direction substantially coinciding with the long side of the band saw blade 16. This facilitates mounting the band saw blade 16 in the groove 18. It will also be noted that the handle 31 operates in a horizontal plane. These two features of the invention permit the band saw blade to be severed without completely removing the band saw blade from the band saw and enables the operator to produce a burrless, clean, and substantially square cut, with the result that when the ends of the band saw blade are welded together, the weld will be substantially perfect, resulting in no interference with the further use and operation of the band saw blade 16.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

An attachment for a band saw, the latter having oppositely disposed pulleys over which an elongated continuous band saw blade is removably mounted, said attachment comprising an elongated mounting block having means for connection to an adjacent frame of the band saw and provided with a guide groove extending in the direction of its length and in a direction corresponding to the long sides of the band saw blade, and in which a portion of said band saw blade is adapted to be mounted when said band saw blade is removed from said pulleys, a means for removably clamping said blade portion in said groove, a shearing blade carried by said plate at one end of the groove, a handle pivotally mounted on one end of said plate and movable through a plane substantially at right angles with respect to the plane of said adjacent frame of said band saw, and a shearing blade carried by said handle for cooperating with the shearing blade carried by said plate, substantially as described.

CHRISTOPHER J. ANDERSON.

REFERENCES CITED

The following references are of record in the file of this patent:

UNITED STATES PATENTS

| Number | Name | Date |
| --- | --- | --- |
| 338,396 | Fitts | Mar. 23, 1886 |
| 612,774 | Hicks | Oct. 18, 1898 |
| 2,080,475 | Hedgpeth | May 18, 1937 |
| 2,180,079 | Wilkie | Nov. 14, 1939 |
| 2,353,390 | Carlin | July 11, 1944 |